United States Patent [19]

Hayashi, deceased et al.

[11] Patent Number: 5,035,984

[45] Date of Patent: Jul. 30, 1991

[54] METHOD FOR FORMING A DIRECT POSITIVE IMAGE

[75] Inventors: Kazunoi Hayashi, deceased, late of Hikone; Masahiro Hayashi, legal representative; Masako Hayashi, legal representative, both of Nara, all of Japan;

[73] Assignee: Fuji Photo Film Co., Ltd., Kanagawa, Japan

[21] Appl. No.: 432,003

[22] Filed: Nov. 6, 1989

[30] Foreign Application Priority Data

Nov. 4, 1988 [JP] Japan ................ 63-278589

[51] Int. Cl.$^5$ ............ G03C 5/50; G03C 1/485
[52] U.S. Cl. ............ 430/378; 430/406; 430/409; 430/410; 430/598; 430/940
[58] Field of Search ......... 430/378, 406, 409, 410, 430/598, 940

[56] References Cited

U.S. PATENT DOCUMENTS

| | | | |
|---|---|---|---|
| 4,801,520 | 1/1989 | Inoue et al. | 430/378 |
| 4,859,579 | 8/1989 | Hirano et al. | 430/598 |
| 4,863,839 | 9/1989 | Heki et al. | 430/378 |

FOREIGN PATENT DOCUMENTS

| | | | |
|---|---|---|---|
| 283041 | 9/1988 | European Pat. Off. | |
| 15248 | 1/1988 | Japan | 430/378 |
| 47766 | 2/1988 | Japan | 430/378 |
| 226652 | 9/1988 | Japan | 430/378 |
| 1402 | 2/1988 | PCT Int'l Appl. | 430/940 |

Primary Examiner—Charles L. Bowers, Jr.
Assistant Examiner—Patrick A. Doody
Attorney, Agent, or Firm—Sughrue, Mion, Zinn, Macpeak & Seas

[57] ABSTRACT

A method for forming a direct positive image by the steps of:
(a) imagewise exposing a photosensitive material comprising a support having thereon at least one light-sensitive silver halide emulsion layer containing non-prefogged silver halide grains capable of forming an internal latent image; at least one of the light-sensitive emulsion layer or the other hydrophilic colloidal layer of the photosensitive material containing the following compound (a):

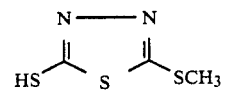

(b) developing the exposed material in the presence of a developing agent and at least one nucleating agent; and
(c) at least one of fixing and bleaching said developed photosensitive material to form a positive image.

When used for making computer output images, the method according to the present invention provides rapid and stable formation of direct positive images with a high Dmax and a low Dmin, and prevents re-reversal negative formation during high illuminance exposure.

4 Claims, No Drawings

METHOD FOR FORMING A DIRECT POSITIVE IMAGE

FIELD OF THE INVENTION

The present invention relates to a silver halide photographic material which permits formation of direct positive images using a highly stable processing solution and to an image formation method using this material. More particularly, the present invention relates to a silver halide photographic material that is useful for computer output film (COM film) and to an image formation method using this material.

BACKGROUND OF THE INVENTION

The rapid development of computers has established the information industry of today and has been accompanied by very active research into methods for outputting massive amounts of records. Silver halide photographic materials that are suitable for reversal processing are used as recording materials in this field. Processing in this reversal development consists of forming a negative image by a first development process, and not subjecting it to fixing but to bleaching to desilver the reduced silver in the negative image. The remaining undeveloped image silver halide is exposed and a second development is performed to produce a positive image. Because of the complexity of the processing stages, the film finishing rate is slow and there are fluctuations in the maximum density (Dmax) and minimum density (Dmin). In addition, there are problems of environmental pollution since powerful oxidizing agents such as potassium dichromate have to be used in the bleaching solution.

Photographic methods for producing direct positive images without a reversal processing stage or a negative film are well-known methods for resolving these problems.

From the point of view of practical use, with the exception of special methods, these conventional methods for producing positive images using direct positive silver halide photographic materials can be classified into two types.

One type uses a prefogged silver halide emulsion and a direct positive image is obtained after development by using solarization or the Herschel effect, to break down the fogging nuclei (the latent image) of exposed portions.

The other type uses a non-fogged internal latent image type silver halide emulsion and direct positive images are obtained by performing surface development while effecting fogging treatment or after effecting a fogging treatment, following image exposure.

This "internal latent image type silver halide emulsion" is a silver halide emulsion in which the silver halide grains have photosensitive nuclei mainly in their interiors and exposure results in formation of a latent image mainly inside the grains.

The second procedure gives greater speeds than the first type and is more suited to applications where high speeds are demanded, and the present invention relates to the internal latent image type silver halide emulsion.

A variety of techniques are known in this technical field, principal examples being disclosed in U.S. Pat. Nos. 2,592,250, 2,466,957, 2,497,875, 2,588,982, 3,317,322, 2,497,875, 3,761,266, 3,761,276 and 3,796,577 and British Patents 1,151,363, 1,150,553 and 1,011,062.

These known methods make it possible to produce a photosensitive material with comparatively high speed as a direct positive type material.

Details of the mechanism of direct positive image formation are given in, e.g., *The Theory of the Photographic Process* by T. H. James, (4th edition), Chapter 7, pages 182-193 and U.S. Pat. No. 3,761,276.

It is believed that as the result of a surface desensitization action originating in an internal latent image produced inside the silver halide in response to initial image exposure, there occurs selective formation of fogging nuclei only on the surfaces of the silver halide grains in unexposed portions, and that following this by ordinary surface development processing results in formation of a photographic image (direct positive image) in the unexposed portions.

Methods which are generally called "light fogging methods" in which the entirety of photosensitive surfaces are subjected to a second exposure (e.g., British Patent 1,151,363) and methods called "chemical fogging methods" using nucleating agents are known as means for selectively producing fogging nuclei as noted above. A description of the chemical fogging method is given, e.g., at pages 72-87 of *Research Disclosure* Volume 151, No. 15162 (published November 1976).

Materials with which nucleating agent effects are achieved only at a high pH of 12 or more are used in conventional chemical fogging methods, but deterioration of the developing agent due to air oxidation is liable to occur in these high pH conditions and consequently there is the drawback that the development activity is extremely reduced. There is also the drawback that processing takes a long time because the development rate is slow, and in particular the processing takes even longer if a low pH developing solution is used. There is also the drawback that processing takes a long time even if the pH is increased to 12 or more.

In contrast, light fogging methods are comparatively advantageous for practical uses since they do not need high pH conditions. On the other hand, there are various technical problems if a variety of technical purposes are to be served over a broad photographic field. That is, since a light fogging method is based on formation of fogging nuclei through photolysis of silver halide, the appropriate illuminance and quantity of exposure vary depending on the type and characteristics of the silver halide used. This means that there are the drawbacks that it is difficult to achieve constant performance and that the development apparatus is complex and costly. There is the further drawback that development takes a long time.

It has been found difficult to produce good, stable direct positive images in both these conventional types of fogging methods. Compounds which display a nucleating action even at a pH of 12 or less have been proposed in JP-A-52-69613 (the term "JP-A" used herein means an "unexamined published Japanese patent application") and U.S. Pat. Nos. 3,615,615 and 3,850,638 as means for resolving this problem but these nucleating agents have the drawbacks that they act on silver halide during storage of sensitive material prior to processing and that they themselves are decomposed, leading to a fall in the post-processing maximum image density.

It has been disclosed in U.S. Pat. No. 3,227,552 that intermediate density development rates are increased by use of hydroquinone derivatives. However, even when these derivatives are used the development rate is still insufficient and with a developing solution with a pH of 12 or less only an unsatisfactory development rate is obtained.

JP-A-60-170843 discloses addition of mercapto compounds containing carboxylic acid groups or sulfonic acid groups to increase the maximum image density, but the effects of adding these compounds are slight.

JP-A-55-134848 discloses that processing in a processing solution (pH 12.0) containing tetraazaindene compounds in the presence of a nucleating agent reduces the minimum image density and prevents formation of a re-reversal negative image, but it is not possible to achieve a high maximum image density or quick development rates with this method.

JP-B-45-12709 (the term "JP-B" as used herein means an "examined Japanese patent publication") discloses addition of triazolinethione compounds and tetrazolinethione compounds as antifoggants to sensitive materials for forming direct positive images by a light fogging process, but it is not possible to achieve high maximum image density or a rapid development rate with this method.

Thus, conventional techniques do not permit direct positive images with high maximum image density and low minimum image density to be produced in a short time.

There is also the problem that, in general, the higher the speed of a direct positive emulsion, the greater is the occurrence of re-reversal negative images in high illuminance exposure. For COM film in particular, high speed with short CRT exposure is demanded, and so it is important to prevent re-reversal negative images on high illuminance exposure.

Japanese Patent Applications 61-136949 and 61-153481 disclose techniques for resolving the above noted problems but these procedures are unsatisfactory in respect of prevention of re-reversal negative images.

SUMMARY OF THE INVENTION

A first object of the present invention is to provide a method for rapid and stable formation of direct positive images with a high Dmax and a low Dmin through development processing of non-prefogged internal latent image type silver halide photographic materials in the presence of a nucleating agent.

A second object of the present invention is to provide direct positive silver halide photographic material for COM film which makes use of the reversal characteristics of internal latent image type silver halide emulsions and nucleating agents.

A third object of the present invention is to provide direct positive silver halide photographic material with which there is little occurrence of rereversal negative images in high illuminance exposure.

A fourth object of the present invention is to provide a method of forming direct positive images with which there is little variation of Dmax or Dmin even if the pH of developing solution is varied.

A fifth object of the present invention is to provide direct positive silver halide photographic material with which there is little variation of Dmax or Dmin even during long-term storage of the photosensitive material.

It has now been found that these and other objects of the present invention are achieved by a method for forming a direct positive image comprising the steps of:

(a) imagewise exposing a photosensitive material comprising a support having thereon at least one light-sensitive silver halide emulsion layer containing non-prefogged silver halide grains capable of forming an internal latent image; at least one of the light-sensitive emulsion layer or the other hydrophilic colloidal layer in the photosensitive material containing the following compound (a):

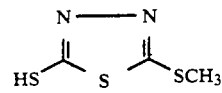

(b) developing said exposed material in the presence of a developing agent and at least one nucleating agent; and (c) at least one of fixing and bleaching said developed photosensitive material to form a positive image.

DETAILED DESCRIPTION OF THE INVENTION

The amount of compound (a) added per 1 mole of the silver halide is preferably $1 \times 10^{-6}$ to $1 \times 10^{-2}$ and more preferably $1 \times 10^{-5}$ to $1 \times 10^{-2}$ moles.

Compound (a) of the present invention is described as a nucleation accelerator in Japanese Patent Applications 61-136948, 61-136949, 63-51288, 63-51287 and 63-82543, JP-A-63-8740, and JP-A-63-231448.

As used herein, the term "nucleating agent" means a substance which acts to form a direct positive image and becomes effective at the time of surface development processing of a non-prefogged internal latent image type silver halide emulsion.

All known compounds used for the purpose of nucleating internal latent image type silver halides may be used as nucleating agents in the present invention. Two or more types of nucleating agents may be used in combination. In more detail, these include, e.g., the nucleating agents described in *Research Disclosure* No. 22,534 (published January 1983, pages 50 to 54), and they can be broadly classified into three groups, of hydrazine compounds, quaternary heterocyclic compounds and compounds other than these.

The heterocyclic compounds include, for example, the compounds described in *Research Disclosure* No. 15,162 (published November 1976, pages 76 to 77) and *Research Disclosure* No. 23,510 (published November 1983, pages 346 to 352). More specifically, they include the substances described in the patents noted below.

Examples of hydrazine nucleating agents having silver halide adsorption groups include those disclosed in U.S. Pat. Nos. 4,030,925, 4,080,207, 4,031,127, 3,718,470, 4,269,929, 4,276,364, 4,278,748, 4,385,108 and 4,459,347, British Patent 2,011,391B, JP-A-54-74729, JP-A-55-163533, JP-A-55-74536 and JP-A-60-179734.

Other examples of hydrazine nucleating agents include the compounds disclosed in JP-A-57-86829 and U.S. Pat. Nos. 4,560,638, 4,478, 2,563,785 and 2,588,982.

Examples of quaternary heterocyclic compounds include the compounds disclosed in *Research Disclosure* No. 22,534, JP-B-49-38164, JP-B-52-19452 and JP-B-52-47326, JP-A-52-69613, JP-A-52-3426, JP-A-55-138742, JP-A-60-11837, U.S. Pat. No. 4,306,016 and *Research Disclosure* No. 23,213 (published August 1983, pages 267 to 270).

Preferred nucleating agents in the present invention are represented by formulae (N-I) and (N-II):

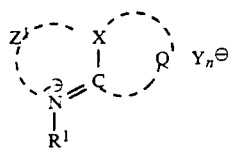 (N-I)

In the formula, $Z^1$ represents a nonmetallic atomic group necessary for forming a 5- to 6-membered hetero ring. This hetero ring may further be fused with an aromatic ring or hetero ring. $R^1$ represents an aliphatic group and X represents

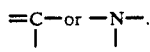

Q represents a nonmetallic atomic group necessary for forming a 4- to 12-membered non-aromatic hydrocarbon ring or non-aromatic hetero ring. At least one of $R^1$, $Z^1$ and Q contain alkynyl group, and at least one of $R^1$, $Z^1$ and Q may contain a group for accelerating adsorption to silver halide. Y represents a counter ion necessary for charge balance, and n is the number of counter ions needed to establish the charge balance.

The nucleating agents represents by formula (N-I) are now described in more detail. The hetero-rings that are completed by $Z^1$ include, e.g., quinolinium, benzimidazolium, pyridinium, thiazolium, selenazolium, imidazolium, tetrazolium, indolenium, pyrrolinium, phenanthridinium, isoquinolinium and naphthopyridium nuclei. $Z^1$ may be substituted by a substituent, including alkyl, alkenyl, aralkyl aryl, alkynyl, hydroxyl alkoxy and aryloxy groups, halogen atoms and amino, alkylthio, arylthio, acyloxy, acylamino, sulfonyl, sulfonyloxy, sulfonylamino, carboxyl, acyl, carboamoyl, sulfamoyl, sulfo, cyano, ureido, urethane, carbonate, hydrazine, hydrazone and imino groups. At least one of these substituents may be selected as substituents for $Z^1$ and if there are two or more they may be the same or different. Also, these substituents may be further substituted by these substituents.

It is also possible to have as substituents for $Z^1$ a heterocyclic quaternary ammonium group that is completed by $Z^1$ via divalent linking group $L^1$. This structure is dimer structure.

Preferred heterocyclic group nuclei formed by $Z^1$ are quinolinium, benzimidazolium, pyridinium, acridinium, phenanthridinium, naphthopyridinium and isoquinolinium nuclei. More preferably they are quinolinium, naphthopyridinium or benzimidazolium nuclei and most preferably they are quinolinium nuclei.

The aliphatic groups for $R^1$ are preferably unsubstituted alkyl groups having 1 to 18 carebon atoms or substituted alkyl groups with alkyl portions having 1 to 18 carbon atoms. The substituents for $R^1$ include those described for $Z^1$.

$R^1$ is preferably an alkynyl group, and a propargyl group is most preferred.

Q is an atomic group necessary for forming a 4 to 12 membered non-aromatic hydrocarbon ring or non-aromatic hetero ring. Such rings may further be substituted by the substituents described for $Z^1$.

Examples of non-aromatic hydrocarbon rings when X is a carbon atom include cyclopentane, cyclohexane, cyclohexene, cycloheptane, indan and tetralin.

The non-aromatic hetero-rings are rings containing, e.g., nitrogen, oxygen, sulfur or selenium atoms as hetero-atoms and examples when X is a carbon atom include tetrahydrofuran, tetrahydropyran, butyrolactone, pyrrolidone and tetrahydrothiophene rings. Examples when X is a nitrogen atom include pyrrolidine, piperidine, pyridine, piperazine, perhydrothiazine, tetrahydroquinoline and indoline rings.

Cases in which X is a carbon atom, are preferred for the ring nuclei that are formed by Q, and examples of the ring nuclei include cyclopentane, cyclohexane, cycloheptane, cyclohexene, indan, tetrahydropyran and tetrahydrothiophene in particular.

At least one of $R^1$, $Z^1$ and Q contains an alkynyl group (preferably having 2 to 18 carbon atoms), e.g., ethynyl, propargyl, 2-butynyl, 1-methyl-propargyl, 1,1-di-methylpropargyl, 3-butynyl or 4-pentynyl groups. These may further be substituted by the groups described as substituents for $Z^1$. Propargyl is the preferred alkynyl group, and in particular the case where $R^1$ is a propargyl group is the most preferred.

Groups represented by $X^1\text{-}(L^1)_m$ are preferred as silver halide adsorption acceleration groups that are contained in $R^1$, Q and $Z^1$.

$X^1$ here is a silver halide adsorption accelerating group; and $L^1$ is a divalent linking group. m is 0 or 1. Preferred examples of silver halide adsorption accelerating groups represented by $X^1$ include thioamido, mercapto and 5- to 6-membered nitrogen-containing heterocyclic groups.

These may by substituted by the substituents described for $Z^1$. Acyclic thioamido groups (e.g., thiourethane, thioureido) are preferred as thioamido groups.

Heterocyclic mercapto groups (e.g., 5-mercaptotetrazole, 3-mercapto-1,2,4-triazole, 2-mercapto-1,3,4-thiadiazole, 2-mercapto-1,3,4-oxadiazole) are particularly preferred as mercapto groups for $X^1$.

5- to 6-membered nitrogen-containing hetero-rings represented by $X^1$ contain combinations of nitrogen, oxygen, sulfur and carbon, and preferred rings include rings which form imino silver, e.g., benzotriazole or aminothiazole.

Divalent linking groups represented by $L^1$ are atoms or atomic groups containing at least one of the elements C, N, S and O. Specifically, examples of the divalent groups include alkylene, alkenylene, alkynylene or arylene groups, —O—, —S—, —NH—, —N=, —CO— and —SO$_2$— (which groups may be substituted) alone or in combination. Preferred examples of combinations include

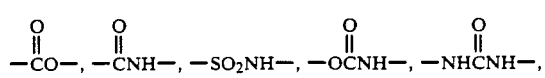

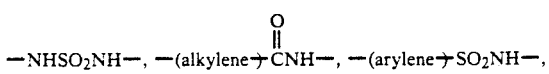

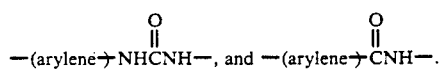

Examples of counter ions Y for charge balance include bromide, chloride, fluoride, p-toluenesulfate, ethylsulfonate, perchlorate, trifluoromethanesulfonate, thiocyanate, $BF_4^-$ and $PF_6^-$ ions.

Preferred compounds represented by formula (N-I) contain silver halide adsorption accelerating groups, and in particular, thioamido, azole or heterocyclic mercapto groups that are used as adsorption accelerating groups $X^1$ are more preferred. Examples of such compounds and methods for synthesizing them are disclosed in, e.g., JP-A-63-301942 and the patents and documents cited therein.
Specific examples of compounds represented by formula (N-I) are as follows, but the invention is not to be construed as being limited hereto.
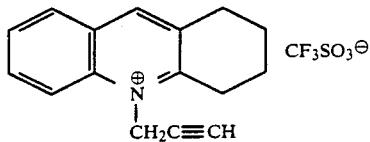
(N-I-1)
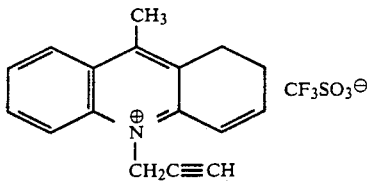
(N-I-2)
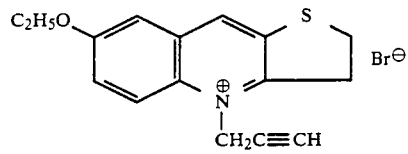
(N-I-3)
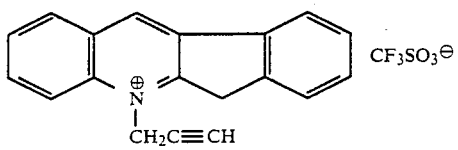
(N-I-4)
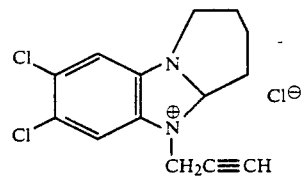
(N-I-5)
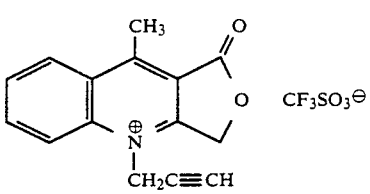
(N-I-6)
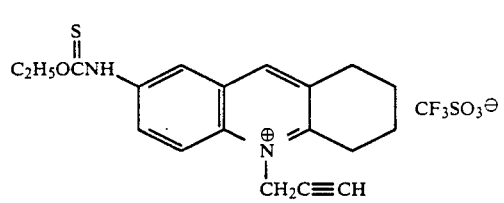
(N-I-7)
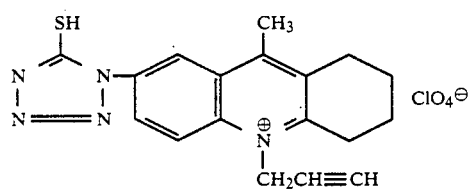
(N-I-8)

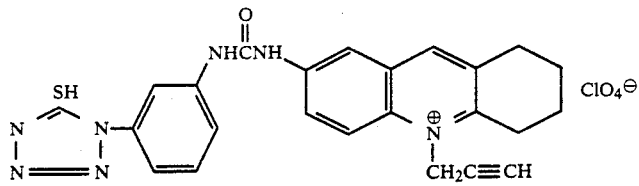
(N-I-9)
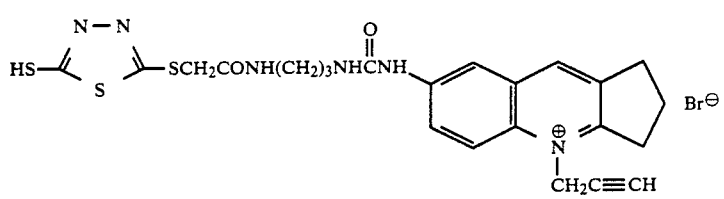
(N-I-10)
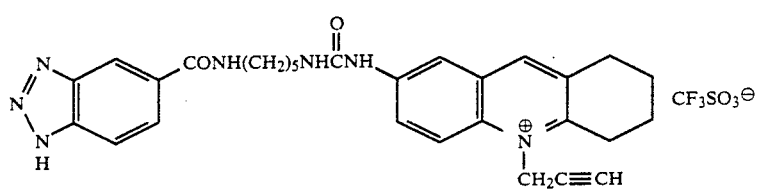
(N-I-11)
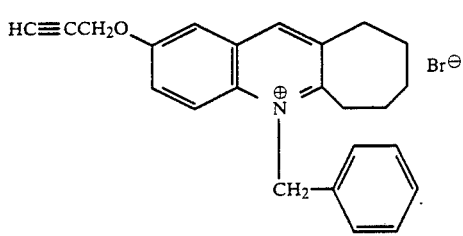
(N-I-12)
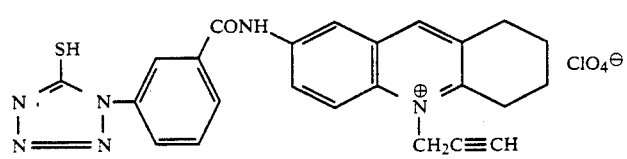
(N-I-13)
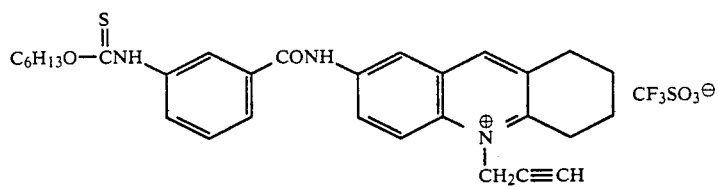
(N-I-14)
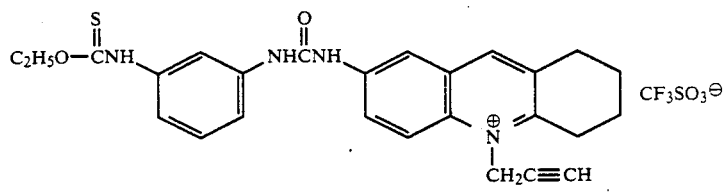
(N-I-15)
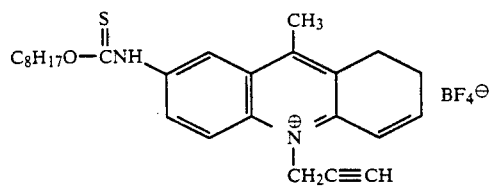
(N-I-16)

-continued
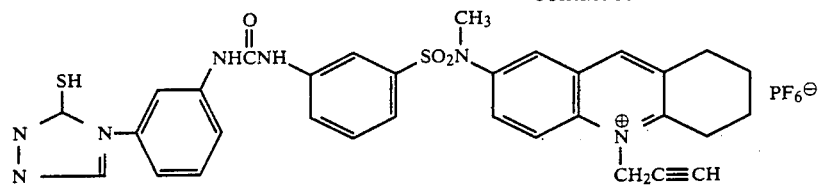
(N-I-17)
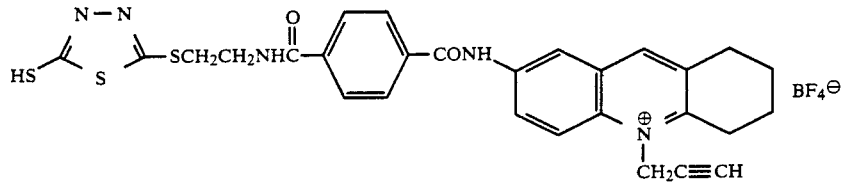
(N-I-18)
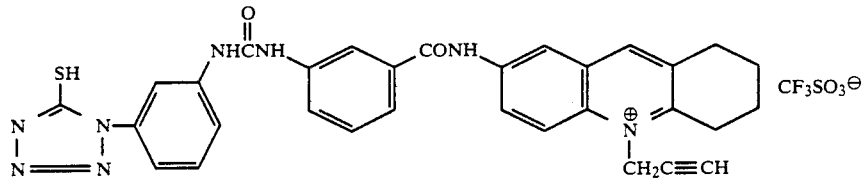
(N-I-19)
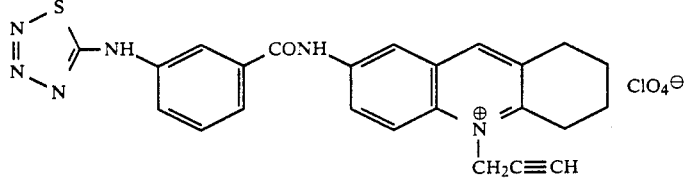
(N-I-20)
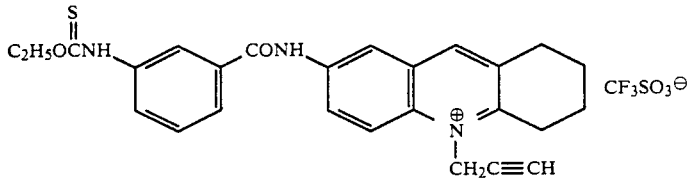
(N-I-21)
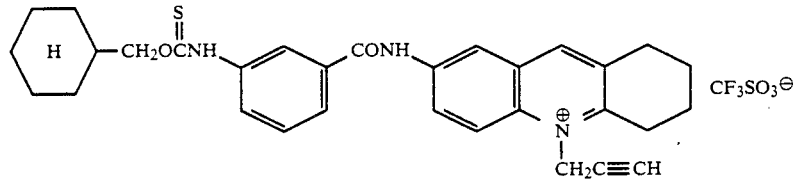
(N-I-22)
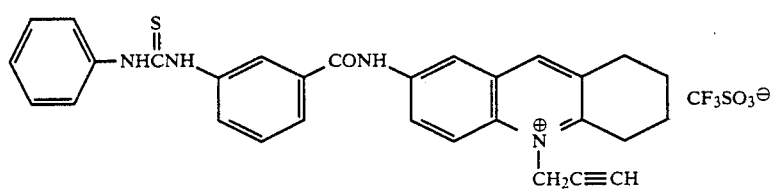
(N-I-23)
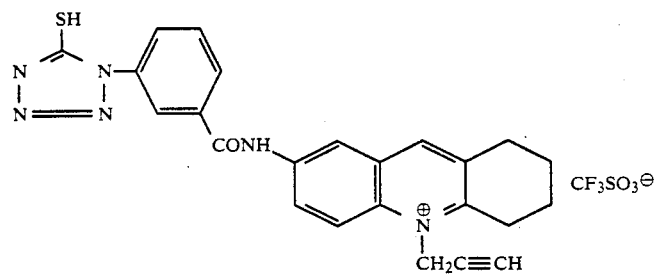
(N-I-24)

The compounds represented by formula (N-I) may be synthesized by the methods described in, e.g., *Research Disclosure* No. 22,534 (published January 1983, pages 50 to 54) and U.S. Pat. No. 4,471,044 or methods similar thereto.

Nucleating agents represented by formula (N-II) are now described in greater detail.

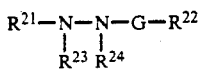    (N-II)

wherein $R^{21}$ represents an aliphatic, aromatic or heterocyclic group; $R^{22}$ represents hydrogen or an alkyl (preferably having 1 to 30 carbon atoms), aralkyl (preferably having 7 to 30 carbon atoms), aryl (preferably having 6 to 30 carbon atoms), alkoxy (preferably having 1 to 30 carbon atoms), aryloxy (preferably having 6 to 30 carbon atoms) or amino group; G represents a carbonyl, sulfonyl, sulfoxy, phosphoryl or iminomethylene

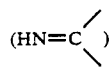

group and $R^{23}$ and $R^{24}$ both represent hydrogen or one of them represents hydrogen and the other represents an alkylsulfonyl (preferably having 1 to 20 carbon atoms), arylsulfonyl (preferably having 6 to 20 carbon atoms) or acyl group. There may be formed a hydrazone structure

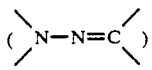

in a form containing G, $R^{23}$, $R^{24}$ and hydrazine nitrogen. The above groups may also be substituted by substituents in cases where substitution is possible.

Aliphatic groups represented by $R^{21}$ in formula (N-II) are straight-chain, branched or cyclic alkyl (preferably having 1 to 30 carbon atoms), alkenyl (preferably having 2 to 30 carbon atoms) or alkynyl (preferably having 2 to 30 carbon atoms) groups.

Aromatic groups represented by $R^{21}$ are single or two ring aryl groups (preferably having 6 to 30 carbon atoms), e.g., phenyl or naphthyl groups.

The hetero-rings represented by $R^{21}$ are 3- to 10-membered saturated or unsaturated hetero-rings containing at least one of N, O and S, and may be single rings or may form fused rings with other aromatic rings or hetero-rings. Preferred hetero-rings are 5- to 6-membered aromatic hetero-rings and examples include pyridyl, quinolinyl, imidazolyl and benzimidazolyl groups.

$R^{21}$ may be substituted by substituents. Examples of substituents include the following, and these groups may be further substituted.

For example, the substituents include alkyl, aralkyl, alkoxyalkyl- or alkoxyaryl-substituted amino, acylamino, sulfonylamino, ureido, urethane, aryloxy, sulfamoyl, carbamoyl, aryl, alkylthio, arylthio, sulfonyl, sulfinyl and hydroxyl groups, halogen atoms and cyano, sulfo and carboxyl groups.

These groups may be linked to form rings in cases where this is possible.

Preferred groups for $R^{21}$ are aromatic, aromatic heterocyclic and aryl-substituted methyl groups, and aryl groups are more preferred.

Among the groups represented by $R^{22}$, preferred groups when G is a carbonyl group are hydrogen, alkyl groups (e.g., methyl, trifluoromethyl, 3-hydroxypropyl, 3-methanesulfonamidopropyl), aralkyl groups (e.g., o-hydroxybenzyl), aryl groups (e.g., phenyl, 3,5-dichlorophenyl, o-methanesulfonamidophenyl, 4-methanesulfonylphenyl).

Preferred groups represented by $R^{22}$ when G is a sulfonyl group include alkyl groups (e.g., methyl), aralkyl groups (e.g., o-hydroxyphenylmethyl), aryl groups (e.g., phenyl) and substituted amino groups (e.g., dimethylamino).

The substituents for $R^{22}$ include the substituents listed for $R^{21}$ and in addition to these, e.g., acyl, acyloxy, alkyloxycarbonyl, aryloxycarbonyl, alkenyl, alkynyl or nitro groups.

These substituents may be further substituted by these substituents and they may be linked to form rings.

It is preferred that $R^{21}$ or $R^{22}$, and particularly $R^{21}$, contain an antidiffusion groups or ballast groups for couplers. Such ballast groups have 8 or more carbon atoms and contain one or a combination of two or more groups such as alkyl, phenyl, ether, amido, ureido, urethane, sulfonamido and thioether groups.

$R^{21}$ or $R^{22}$ may contain the group $X^2 \text{--} (L^2)_{m2}$, which accelerates adsorption of the compound represented by formula (N-II) on the surfaces of silver halide grains. $X^2$ here has the same meaning as $X^1$ in formula (N-I) and is preferably a thioamido group (excluding thiosemicarbazides or a substituted thiosemicarbazide), mercapto group or 5- to 6-membered nitrogen-containing heterocyclic group. $L^2$ represents a divalent linking group and has the same meaning as $L^1$ in formula (N-I); and m2 is 0 or 1.

It is more preferred that $X^2$ is a cyclic thioamido group (i.e., a mercapto-substituted nitrogen-containing hetero-ring, e.g., a 2-mercaptothiadiazole, 3-mercapto-1,2,4-triazole, 5-mercaptotetrazole, 2-mercapto-1,3,4-oxadiazole or 2-mercaptobenzoxazole group) or a nitrogen-containing heterocyclic group (e.g., benzotriazole, benzimidazole, indazole).

Hydrogen is most preferred as $R^{23}$ and $R^{24}$.

A carbonyl group is most preferred for G in formula (N-II).

It is preferred that compounds of formula (N-II) contain silver halide adsorption accelerating groups. Particularly preferred silver halide adsorption accelerating groups are the mercapto, cyclic thioamide and nitrogen-containing heterocyclic groups described above formula (N-I).

Specific examples of compounds represented by formula (N-II) are as follows, but the invention is not to be construed as being limited to these compounds.

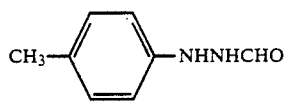 (N-II-1)

-continued
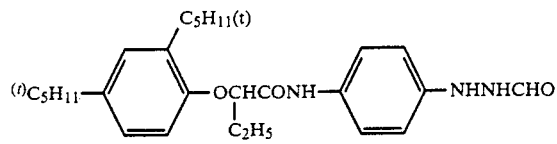 (N-II-2)
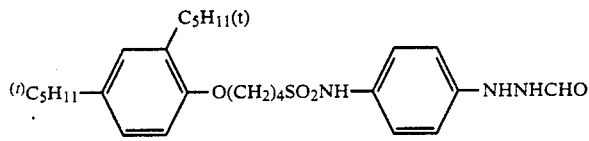 (N-II-3)
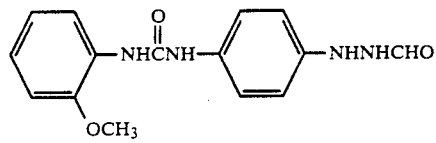 (N-II-4)
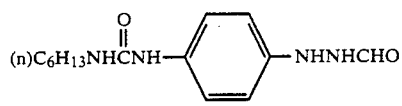 (N-II-5)
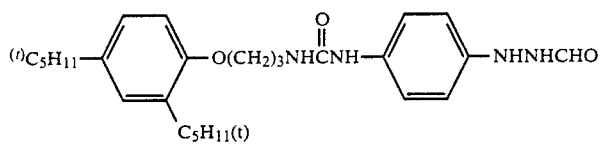 (N-II-6)
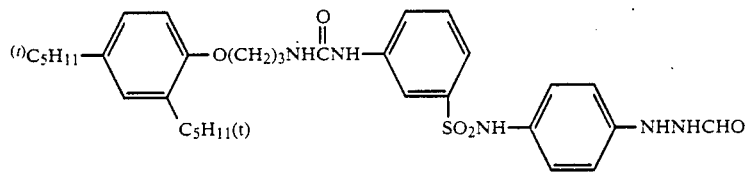 (N-II-7)
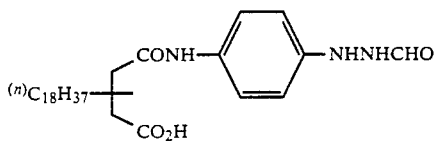 (N-II-8)
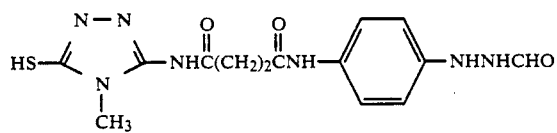 (N-II-9)
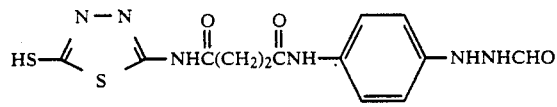 (N-II-10)
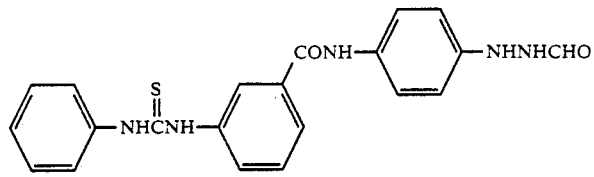 (N-II-11)

-continued
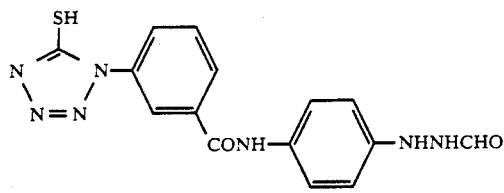  (N-II-12)
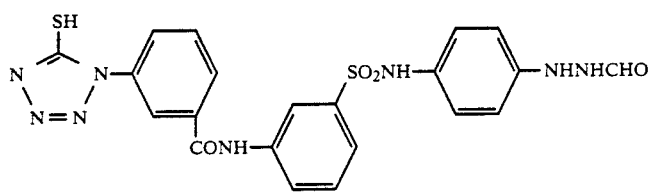  (N-II-13)
(N-II-14)
(N-II-15)
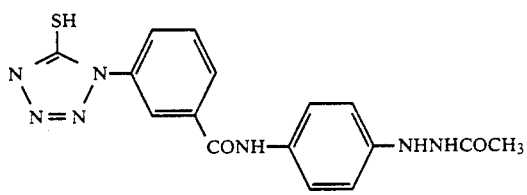  (N-II-16)
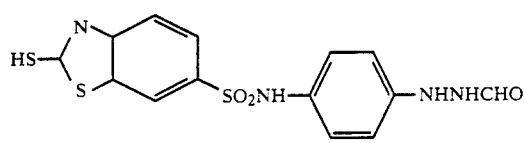  (N-II-17)
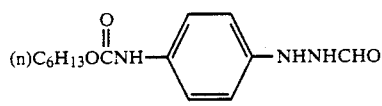  (N-II-18)
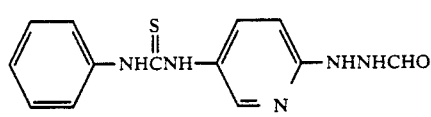  (N-II-19)
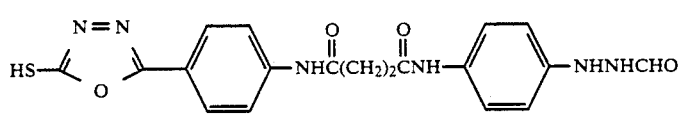  (N-II-20)
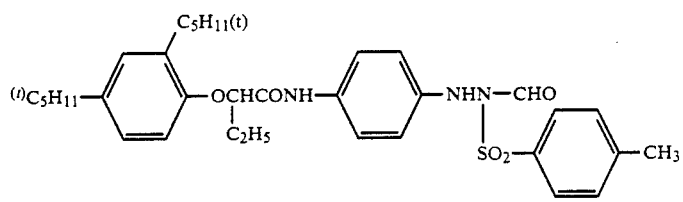  (N-II-21)
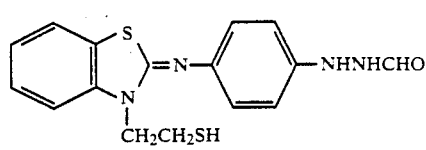

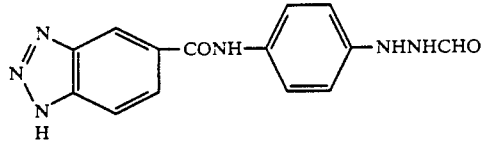
(N-II-22)

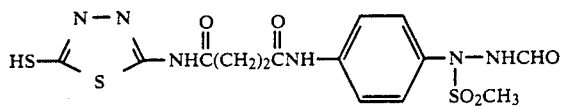
(N-II-23)

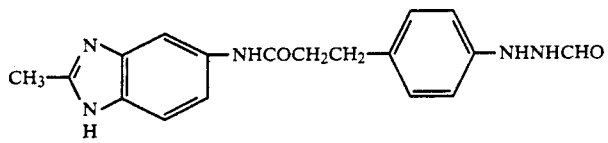
(N-II-24)

Methods for synthesis of the compounds represented by formula (N-II) are disclosed in, e.g., the patents noted in *Research Disclosure* No. 15,162 (published November 1976, pages 76 to 77), No. 22,534 (published January 1983, pages 50 to 54) and No. 23,510 (published November 1983, pages 346 to 352) and U.S. Pat. Nos. 4,080,207, 4,269,924 and 4,276,364.

Any layer ma contain the compounds represented by formulae (N-I) and (N-II) in the photographic photosensitive material in the present invention, but preferably these compounds are present in a silver halide emulsion layer. There are no particular restrictions concerning the amounts used but an amount in the range of from about $1 \times 10^{-8}$ moles to about $1 \times 10^{-2}$ moles per 1 mole of silver in the silver halide emulsion layer is useful and preferably the amount is from $1 \times 10^{-7}$ moles to about $1 \times 10^{-3}$ moles per 1 mole of silver.

Preferably photographic material also contains at least one of the following compounds in order to heighten the effects of the nucleating agent of the invention still further.

Hydroquinones (e.g., the compounds disclosed in U.S. Pat. Nos. 3,227,552 and 4,279,987); chromans (e.g., the compounds disclosed in U.S. Pat. No. 4,268,621, JP-A-54-103031 and *Research Disclosure* No. 18264 (1979)); quinones (e.g., the compounds disclosed in *Research Disclosure* No. 21206 (1981)); amines (e.g., the compounds disclosed in U.S. Pat. No. 4,150,993 and JP-A-58-174757); oxidizing agents (e.g., the compounds disclosed in JP-A-60-260039 and *Research Disclosure* No. 16936 (1978)); catechols (e.g., the compounds disclosed in JP-A-55-21013 and JP-A-55-65944); compounds which release nucleating agents at the time of development (e.g., the compounds disclosed in JP-A-60-107029); thioureas (e.g., the compounds disclosed in JP-A-60-95533); and spirobisindans (e.g., the compounds disclosed in JP-A-55-65944).

Preferably, nucleating agents represented by formula (N-I) are used in the present invention and the following embodiments are more preferred and embodiment (8) is the most preferred.

(1) The case where a silver halide adsorption accelerating group represented by $X^1$ is included as a substituent.
(2) The case in (1) above where the silver halide adsorption accelerating group represented by $X^1$ in (1) above is a thioamido or heterocyclic mercapto group or a nitrogen-containing hetero-ring which forms imino silver.
(3) The case in (2) above where the hetero-ring completed by Z is quinolinium, isoquinolinium, naphthopyridinium or benzothiazolium.
(4) The case in (2) above where the hetero-ring completed by Z is quinolium.
(5) The case in (2) above where an alkynyl group is contained in $R^1$, $R^2$ or Z.
(6) The case in (5) above where $R^1$ is a propargyl group.
(7) The case in (2) above where a thiourethane group constitutes the thioamido group for $X^1$ or a mercaptotetrazole group constitutes the heterocyclic mercapto group for $X^1$.
(8) The case in (6) above where $R^1$ forms a ring by bonding with a hetero-ring that is completed by Z.

When a nucleating agent represented by formula (N-II) is used, the following embodiments are more preferred and embodiment (6) is the most preferred.

(1) The case where a silver halide adsorption accelerating group represented by $X^2$ is included as a substituent.
(2) The case in (1) above where the silver halide adsorption accelerating group represented by $X^2$ in (1) above is a heterocyclic mercapto group or a nitrogen-containing hetero ring which forms imino silver.
(3) The case in (2) above where the group represented by G-$R^{22}$ is formyl.
(4) The case in (3) above where $R^{23}$ and $R^{24}$ are hydrogen.
(5) The case in (3) above where $R^{21}$ is an aromatic group.
(6) The case in (2) above where the heterocyclic mercapto group represented by $X^2$ is a 5-mercaptotetrazole or 5-mercapto-1,2,4-triazole.

The compounds of formulae (N-I) and (N-II) may be used alone or in combination.

Although they do not substantially possess the functions of nucleating agents, "nucleation accelerators" may be used for the purpose of promoting the nucleating agent action in order to increase the maximum density of the direct positive image and/or shorten the time needed to obtain a set direct positive image density.

Specific examples of nucleation accelerators that are useful in the invention are as follows, but the invention is not to be construed as being limited to these examples.

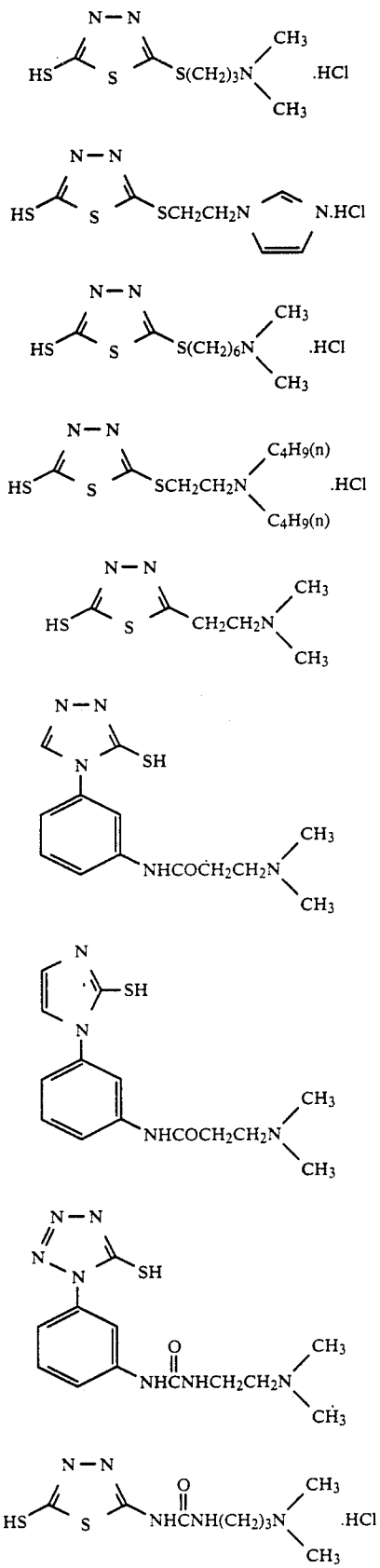

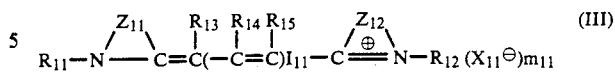

$$R_{11}-N\underset{}{\overset{Z_{11}}{\diagdown}}C=C(-C=C)I_{11}-C\overset{Z_{12}}{\underset{\oplus}{\diagup\diagdown}}N-R_{12}\;(X_{11}^{\ominus})m_{11} \quad \text{(III)}$$

wherein $Z_{11}$ and $Z_{12}$ may be the same or different and represent atomic groups necessary for forming 5- to 6-membered nitrogen-containing heterocyclic nuclei and $I_{11}$ is 0 or 1. It is preferred that $I_{11}$ is 0, $Z_{11}$ and $Z_{12}$ may be the same or different and each represents thiazole, benzothiazole, naphthothiazole, dihydronaphthothiazole, selenazole, benzoselenazole, naphthoselenazole, dihydronaphthoselenazole, oxazole, benzoxazole, naphthoxazole, benzimidazole, naphthoimidazole, pyridine, quinoline, imidazo[4,5-b]quinoxaline or 3,4-dialkylindolenine; and when $I_{11}$ is 1, the nuclei represented by $Z_{11}$ include thiazoline, thiazole, benzothiazole, selenazoline, selenazole, benzoselenazole, oxazole, benzoxazole, naphthoxazole, imidazole, benzimidazole, naphthoimidazole and pyrroline, and the nuclei represented by $Z_{12}$ include oxazoline, oxazole, benzoxazole, naphthoxazole, thiazoline, selenazoline, pyrroline, benzimidazole or naphthoimidazole.

These nitrogen-containing heterocyclic nuclei represented by $Z_{11}$ and $Z_{12}$ may have one or more substituents. Examples of preferred substituents include lower alkyl groups (which may be branched and which may also include substituent groups (e.g., hydroxyl groups, halogen atoms or aryl, aryloxy, arylthio, carboxyl, alkoxy, alkylthio or alkoxycarbonyl groups) and are preferably alkyl groups with not more than 10 carbon atoms, e.g., methyl, ethyl, butyl, chloroethyl, 2,2,3,3-tetrafluoropropyl, hydroxyl, benzyl tolylethyl, phenoxyethyl, phenylthioethyl, carboxypropyl, methoxyethyl, ethylthioethyl, ethoxycarbonylethyl); or lower alkoxy groups (which may have further substituent groups). Examples of substituents include the same substituents for the alkyl groups above. More preferably they are alkoxy groups with 8 or less carbon atoms, e.g., methoxy, ethoxy, pentyloxy, ethoxymethoxy, methylthioethoxy, phenoxyethoxy, hydroxyethoxy, chloropropoxy); hydroxyl groups, halogen atoms, cyano groups, aryl groups (e.g., phenyl, tolyl, anisyl, chlorophenyl, carboxyphenyl), aryloxy groups (e.g., tolyloxy, anisyloxy, phenoxy, chlorophenoxy), arylthio groups (e.g., tolylthio, chlorophenylthio, phenylthio), lower alkylthio groups (which may be substituted with the same substituents for the above lower alkyl group). More preferably they are alkylthio groups with 8 or less carbon atoms (e.g., methylthio, ethylthio, hydroxylthio, carboxyethylthio, chloroethylthio or benzylthio groups); acylamino groups (preferably acylamino groups with 8 or less carbon atoms, e.g., acetylamino, benzoylamino, methanesulfonylamino or benzenesulfonylamino groups); carboxyl groups; lower alkoxycarbonyl groups (preferably alkoxycarbonyl groups with 6 or less carbon atoms, e.g., ethoxycarbonyl or butoxycarbonyl groups); perfluoroalkyl groups (preferably perfluoroalkyl groups with 5 or less carbon atoms, e.g., trifluoromethyl or difluoromethyl groups) and acyl groups (preferably acyl groups with 8 or less carbon atoms, e.g., acetyl, propionyl, benzoyl or benzenesulfonyl groups).

Specific examples of nitrogen-containing heterocyclic nuclei represented by $Z_{11}$ and $Z_{12}$ include thiazo- Also, a sensitizing dye may be used for the purpose of spectral sensitization. Suitable sensitizing dyes include cyanine dyes having a wavelength absorption maximum on silver halide of 590 nm or less, represented by formula (III):

line, 4-methylthiazoline, thiazole, 4-methylthiazole, 4,5-dimethylthiazole, 4-phenylthiazole, benzothiazole, 5-methylbenzothiazole, 6-methylbenzothiazole, 5-ethylbenzothiazole, 5,6-dimethylbenzothiazole, 5-methoxybenzothiazole, 6-methoxybenzothiazole, 5-butoxybenzothiazole, 5,6-dimethoxybenzothiazole, 5-methoxy-6-methylbenzothiazole, 5-chlorobenzothiazole, 5-chloro-6-methylbenzothiazole, 5-phenylbenzothiazole, 5-acetylaminobenzothiazole, 6-propionylaminobenzothiazole, 5-hydroxybenzothiazole, 5-hydroxy-6-methylbenzothiazole, 5-ethoxycarbonylbenzothiazole, 5-carboxybenzothiazole, naphtho[1,2-d]thiazole, naphtho[2,1-d]thiazole, 5-methylnaphtho[1,2-d]thiazole, 8-methoxynaphtho[1,2-d]thiazole, 8,9-dihydronaphthothiazole, 3,3-diethylindolenine, 3,3-dipropylindolenine, 3,3-dimethylindolenine, 3,3,5-trimethylindolenine, selenazoline, selenazole, benzoselenazole, 5-methylbenzoselenazole, 6-methylbenzoselenazole, 5-methoxybenzoselenazole, 6-methoxybenzoselenazole, 5-chlorobenzoselenazole, 5,6-dimethylbenzoselenazole, 5-hydroxybenzoselenazole, 5-hydroxy-6-methylbenzoselenazole, 5,6-dimethoxybenzoselenazole, 5-ethoxycarbonylbenzoselenazole, naphtho[1,2-d]selenazole, naphtho[2,1-d]selenazole, oxazole, 4-methyloxazole, 4,5-dimethyloxazole, 4-phenyloxazole, benzoxazole, 5-hydroxybenzoxazole, 5-methoxybenzoxazole, 5-phenylbenzoxazole, 5-phenethylbenzoxazole, 5-phenoxybenzoxazole, 5-chlorobenzoxazole, 5-chloro-6-methylbenzoxazole, 5-phenylthiobenzoxazole, 6-ethoxy-5-hydroxybenzoxazole, 6-methoxybenzoxazole, naphtho[1,2d]oxazole, naphtho[2,1-d]oxazole, naphtho[2,3-d]oxazole, 1-ethyl-5-cyanobenzimidazole, 1-ethyl-5-chlorobenzimidazole, 1-ethyl-5,6-dichlorobenzimidazole, 1-ethyl-6-chloro-5-cyanobenzimidazole, 1-ethyl-6-chloro-5-trifluoromethylbenzimidazole, 1-propyl-5-butoxycarbonyl benzimidazole, 1-benzyl-5-methylsulfonylbenzimidazole, 1-allyl-5-chloro-6-acetylbenzimidazole, 1-ethylnaphtho[1,2-d]imidazole, 1-ethyl-6-chloronaphtho[2,3-d]imidazole, 2-quinoline, 4-quinoline, 8-fluoro-4-quinoline, 6-ethyl-2-quinoline, 6-hydroxy-2-quinoline and 6-methoxy-2-quinoline.

$R_{11}$ and $R_{12}$ may be the same or different and each represents optionally substituted alkyl or alkenyl groups with 10 carbon atoms or less. Preferred substituents of alkyl and alkenyl groups include sulfo groups, carboxy groups, halogen atoms, hydroxyl groups, alkoxy groups with 6 carbon atoms or less, optionally substituted aryl groups with 8 carbon atoms or less (e.g., phenyl, tolyl, sulfophenyl, carboxyphenyl), heterocyclic groups (e.g., furyl, thienyl), optionally substituted aryloxy groups with 8 carbon atoms or less (e.g., chlorophenoxy, phenoxy, sulfophenoxy, hydroxyphenoxy), acyl groups with 8 carbon atoms or less (e.g., benzenesulfonyl, methanesulfonyl, acetyl, propionyl), alkoxycarbonyl groups with 6 carbon atoms or less (e.g., ethoxycarbonyl, butoxycarbonyl), cyano groups, alkylthio groups with 6 carbon atoms or less (e.g., methylthio, ethylthio), optionally substituted arylthio groups with 8 carbon atoms or less (e.g., phenylthio, tolylthio), optionally substituted carbamoyl groups with 8 carbon atoms or less (e.g., carbamoyl, N-ethylcarbamoyl) and acylamino groups with 8 carbon atoms or less (e.g., acetylamino, methanesulfonylamino). The groups may have one or more substituents.

Specific examples of the groups represented by $R_{11}$ and $R_{12}$ include methyl, ethyl, propyl, allyl, pentyl, hexyl, methoxyethyl, ethoxyethyl, phenethyl, tolylethyl, sulfophenethyl, 2,2,2-trifluoroethyl, 2,2,3,3-tetrafluoropropyl, carbamoylethyl, hydroxyethyl, 2-(2-hydroxyethyoxy)ethyl, carboxymethyl, carboxyethyl, ethoxycarbonylmethyl, sulfoethyl, 2-chloro-3-sulfopropyl, 3-sulfopropyl, 2-hydroxy-3-sulfopropyl, 3-sulfobutyl, 4-sulfobutyl, 2-(2,3-dihydroxypropyloxy)ethyl and 2-[2-(3-sulfopropyloxy)ethoxy]ethyl.

$R_{13}$ and $R_{15}$ represent hydrogen. Also, $R_{13}$ may link with $R_{11}$ or $R_{15}$ may link with $R_{12}$ to form a 5- or 6-membered ring.

$R_{14}$ represents hydrogen or a lower alkyl group (which may be substituted, e.g., methyl, ethyl, propyl, methoxyethyl or phenethyl, and is preferably an alkyl group with not more than 5 carbon atoms).

$X_{11}$ represents an acid anion radical (residue) necessary for charge balance.

$m_{11}$ represents 0 or 1 and in the case of an intramolecular salt, $m_{11}$ is 0.

Preferred sensitization dyes represented by formula (III) are dyes in which $I_{11}$ in the formula is 1; $Z_{11}$ is a heterocyclic-nucleus-forming atomic group such as oxazole, benzoxazole or naphthoxazole, $Z_{12}$ is a heterocyclic-nucleus-forming atomic group such as benzimidazole or naphthoimidazole (where the heterocyclic nuclei represented by $Z_{11}$ and $Z_{12}$ may possess one or more substituents as noted above, and electron-attracting substituents are preferred when $Z_{12}$ is a benzimidazole or naphthoimidazole nucleus), at least one of $R_{11}$ and $R_{12}$ is a group possessing a sulfo, carboxyl or hydroxyl group and $R_{14}$ is hydrogen.

Among the sensitization dyes representable by formula (III), it is particularly preferred that where $Z_{11}$ is an atomic group that forms a benzoxazole nucleus, $Z_{12}$ is an atomic group that forms a benzimidazole nucleus, at least one of $R_{11}$ and $R_{12}$ possesses a sulfo or carboxy group, $R_{14}$ is hydrogen and $I_{11}$ is 1. The heterocyclic nuclei represented by $Z_{11}$ and $Z_{12}$ may have one or more substituents such as noted above and particularly preferred substituents include chlorine atoms, fluorine atoms, cyano groups, alkoxycarbonyl groups with 5 carbon atoms or less, acyl groups with 7 carbon atoms or less and perfluoroalkyl groups with 4 carbon atoms or less such as trifluoromethyl in the case of a benzimidazole nucleus; and optionally substituted phenyl groups with 8 carbon atoms or less, alkyl groups with 5 carbon atoms or less, alkoxy groups with 5 carbon atoms or less, acylamino groups with 5 carbon atoms or less, carboxyl groups, alkoxycarbonyl groups with 5 carbon atoms or less, benzyl groups, phenethyl groups and chlorine atoms in the case of other heterocyclic nuclei.

Specific examples of compounds represented by formula (III) are as follows, but the present invention is not to be construed as being limited thereto.

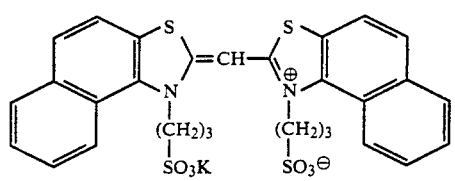 III-1
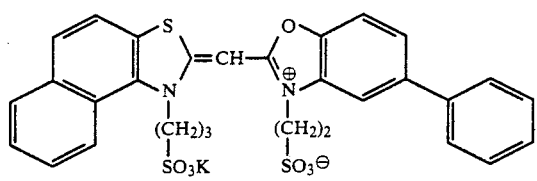 III-2
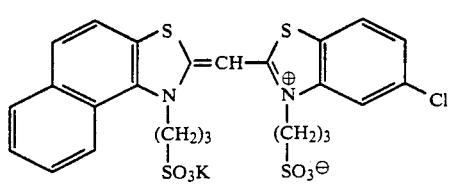 III-3
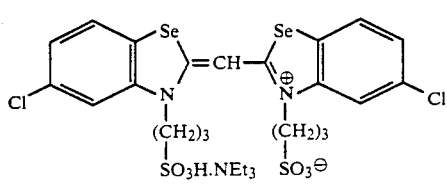 III-4
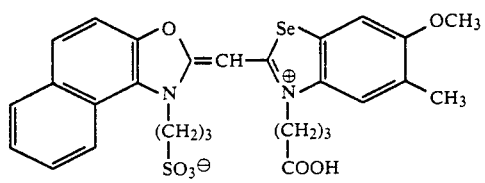 III-5
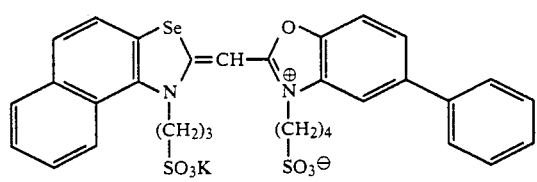 III-6
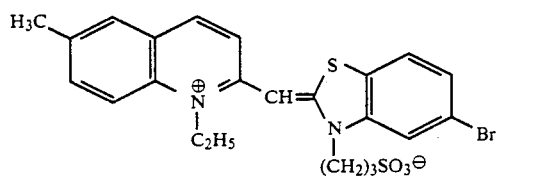 III-7
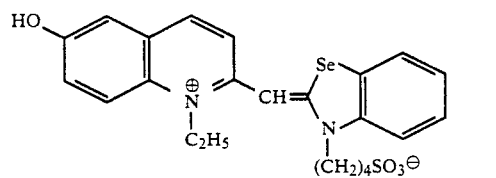 III-8
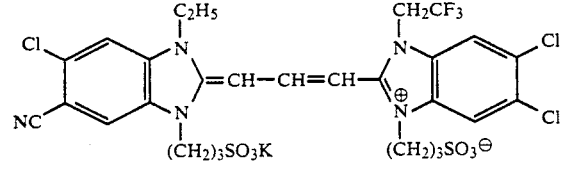 III-9

-continued
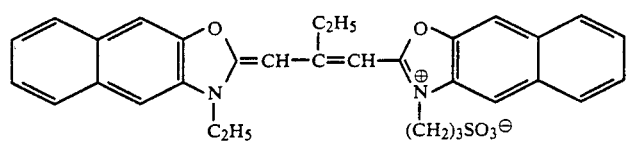 III-10
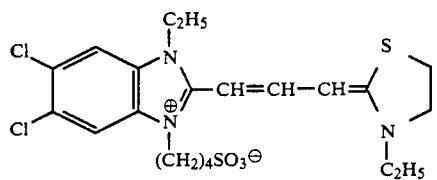 III-11
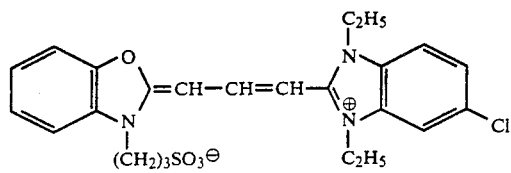 III-12
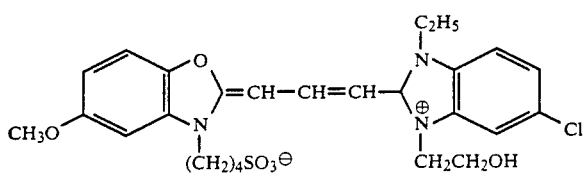 III-13
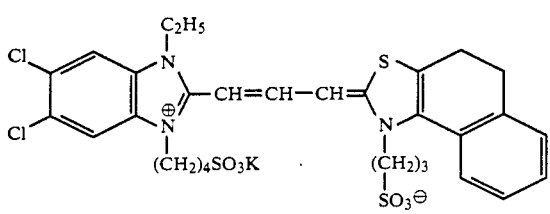 III-14
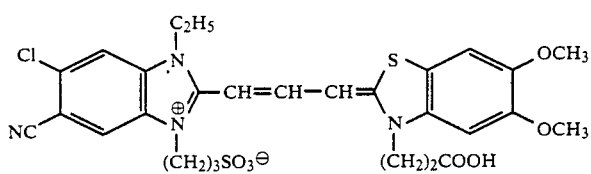 III-15
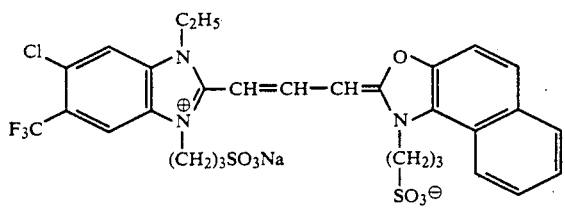 III-16
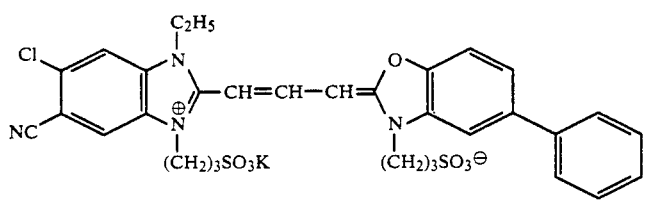 III-17
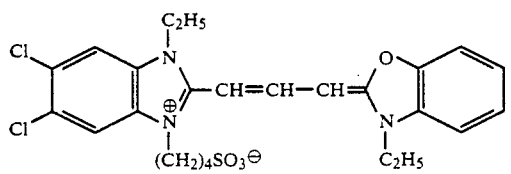 III-18

-continued
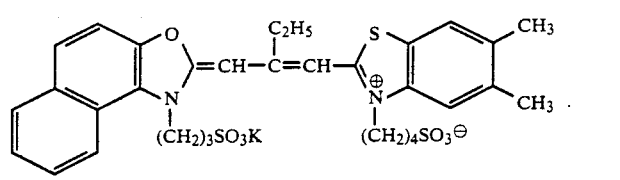 III-19
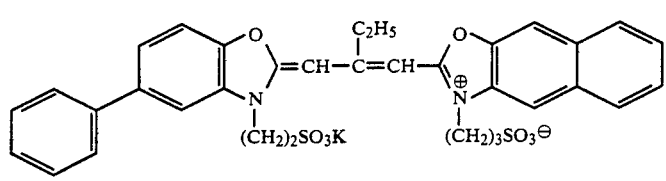 III-20
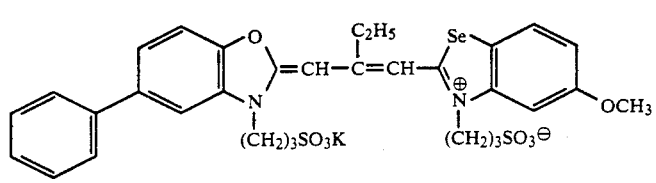 III-21
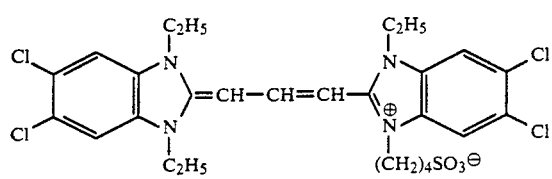 III-22
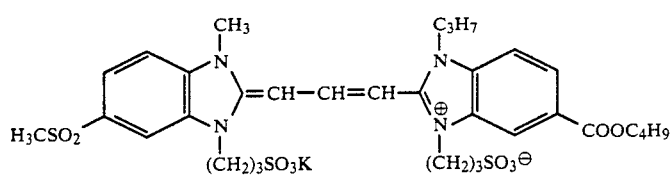 III-23
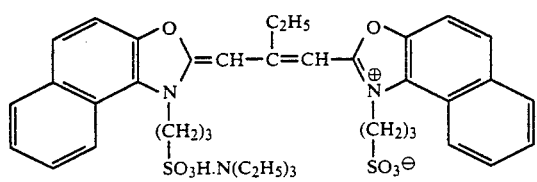 III-24
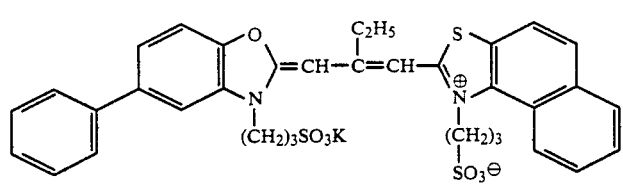 III-25
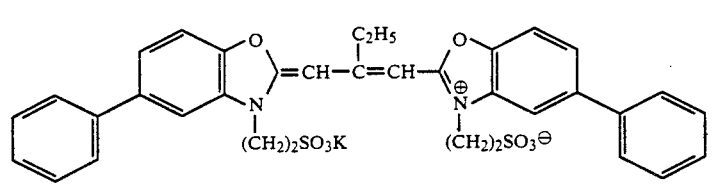 III-26
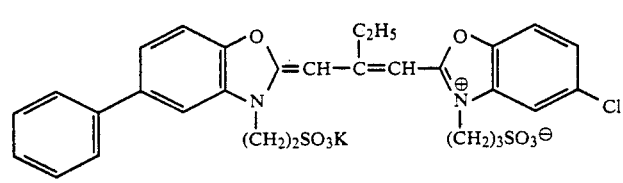 III-27

III-28

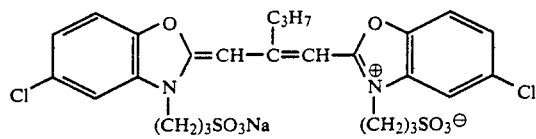

The compounds represented by formula (III) are known compounds and can be synthesized by the methods described in, e.g., JP-A-52-104917; JP-B-48-25652 or JP-B-57-22368; F. M. Hamer, *The Chemistry of Heterocyclic Compounds*, Vol. 18, "The Cyanine Dyes and Related Compounds", A. Weissberger ed., (Interscience, New York, 1964 or D. M. Sturmer, *The Chemistry of Heterocyclic Compounds*, Vol. 30, A Weissburger and E. C. Taylor ed., (John Willy, New York), p. 441.

In the present invention, the compounds represented by formula (III) are used in an amount of generally from $1 \times 10^{-6}$ to $1 \times 10^{-1}$ mol and preferably from $1 \times 10^{-4}$ to $1 \times 10^{-2}$ mol per mol of the silver.

The non-prefogged internal latent image type silver halide emulsion that is used in the present invention is an emulsion containing a silver halide in which the surfaces of the grains is not prefogged, and latent images are mainly formed in the interior of its grains. In more detail, the emulsion is one such that, when a determined amount of silver halide emulsion is coated on a transparent support, the maximum density, as determined by normal densitometry procedure, on exposure for a set time of 0.01 to 10 seconds and development for 6 minutes at 20° C. in the developing solution A (internal development solution) described below, is preferably at least 5 times and more preferably at least 10 times greater than the density obtained on coating of the same amount, exposure in the same manner and development for 5 minutes at 18° C. in the developing solution B (surface development solution) described below.

| Metol | 2.5 g |
| L-Ascorbic acid | 10 g |
| NaBO$_2$.4H$_2$O | 35 g |
| KBr | 1 g |
| Water to make | 1 l |
| Internal developing solution A: | |
| Metol | 2 g |
| Sodium sulfite (anhydrous) | 90 g |
| Hydroquinone | 8 g |
| Sodium carbonate (monohydrate) | 52.5 g |
| KBr | 5 g |
| KI | 0.5 g |
| Water to make | 1 l |

Specific examples of these latent image type emulsions include conversion type silver halide emulsions and core/shell type silver halide emulsions disclosed in British Patent 1,011,062 and U.S. Pat. Nos. 2,592,250 and 2,456,943. Examples of core/shell type silver halide emulsions include the emulsions disclosed in JP-A-47-32813, JP-A-47-32814, JP-A-52-134721, JP-A-52-156614, JP-A-53-60222, JP-A-53-66218, JP-A-53-66727, JP-A-55-127549, JP-A-57-136641, JP-A-58-70221, JP-A-59-208540, JP-A-59-216136, JP-A-60-107641, JP-A-60-247237, JP-A-61-2148, JP-A-61-3137, JP-B-56-18939, JP-B-58-1412, JP-B-58-1415, JP-B-58-6935, JP-B-58-108528, JP-A-62-194248, U.S. Pat. Nos.3,206,313, 3,317,322, 3,761,266, 3,761,276, 3,850,637, 3,923,513, 4,035,185, 4,395,478 and 4,504,570, European Patent 0017148 and *Research Disclosure* RD 16345 (November 1977).

Typical silver halide emulsion compositions comprise mixed silver halides such as, silver chlorobromide, silver chloroiodobromide, and silver iodobromide in addition to silver chloride and silver bromide. The silver halide emulsions that are preferably used in the present invention are emulsions containing silver chloro(iodo)-bromide, silver (iodo)chloride or silver (iodo)bromide, having a silver iodide content of 3 mol % or less and particularly 0 mol % or less.

The silver halide grains have an average grain size (expressed as an average based on projected areas, taking sizes to be grain diameters in the case of spherical or near-spherical grains and to be edge lengths in the case of cubic grains) is preferably 0.1 μm to 2 μm, and an average grain size of 0.15 μm to 1 μm is particularly preferred. The grain size distribution may be broad or narrow but for the sake of improving aspects such as graininess or sharpness preferably is 'monodisperse' silver halide emulsion with a narrow grain size distribution, such that 90% or more, or preferably 95% or more of all the grains (in terms of the weight of number of grains) is within ±40% (preferably within ±30%, and most preferably within ±20%) of the average grain size. In order that the photosensitive material may meet gradation requirements, monodisperse silver halide emulsions with two or more different grain sizes may be included in emulsion layers that have essentially the same color sensitivity or a plurality of grains that have the same size but differ in respect of speed may be mixed in one and the same layer or be provided as multi-layered coatings in different layers. Further, combinations of two or more different polydisperse silver halide emulsions or of a monodisperse emulsion and a polydisperse emulsion may be mixed or used as multi-layers.

The silver halide grains used in the present invention may be regular crystal grains such as cubic, octahedral, dodecahedral, tetradecahedral, or irregular crystal grains such as a spherical, or grains having composite forms combining these crystal forms. The grains may also be tabular. In particular, an emulsion may be used in which tabular grains having a length/thickness ratio of 5 or more, and preferably 8 or more, occupy 50% or more of the total projected area of the grains. Emulsions composed of a mixture of these various forms may also be used.

The silver halide emulsions that are employed in the present invention can be prepared in the presence of silver halide solvents. Silver halide solvents include the organic thioethers disclosed in U.S. Pat. Nos. 3,271,157, 3,531,289 and 3,574,628, JP-A-54-1019 and JP-A-54-158917 and the thiourea derivatives disclosed in JP-A-53-82408, JP-A-55-77737 and JP-A-55-2982.

The silver halide emulsions used in the present techniques such as sulfur or selenium sensitization, reduction sensitization or noble metal sensitization, used alone or in combination for grain interiors or surfaces.

As well as the sensitization dyes of the present invention, the photosensitive material used in the present invention may contain the sensitization dyes disclosed on pages 45 to 53 of JP-A-55-52050 (e.g., cyanine or merocyanine dyes) in order to increase its sensitivity.

These sensitization dyes may be used alone or combinations thereof may be employed, combinations in particular being used for the purpose of supersensitization. Together with sensitization dyes, the emulsions may also contain dyes which do not themselves have a spectral sensitizing action or substances which absorb essentially no visible light but which display supersensitization.

Apart from the dyes noted above, combinations of sensitization dyes and substances as that display strong color sensitization are disclosed in *Research Disclosure* Vol. 176, 17643 (published December 1978), page 23, items IV A to J.

The sensitization dyes can be added at any stage of photographic emulsion manufacture or can be added at any stage up to immediately prior to coating the emulsion after the beginning of production. Examples in the former case are addition at the time of grain formation and addition at the time of physical ripening or chemical ripening.

Water-soluble dyes may be included in emulsion layers or other hydrophilic colloidal layers of the present invention as filter dyes or for preventing irradiation or a variety of other purposes. Dyes whose essential absorption of light is mainly in the 350 to 600 nm region and which serve to lower photographic sensitivity or to improve safety with respect to safe lights are useful as filter dyes.

Depending on the object, these dyes may be added to an emulsion layer or may be added together with mordant dyes above the silver halide emulsion layer, i.e., to a insensitive hydrophilic colloid layer that is further than the silver halide emulsion layer from the support.

The amount added varies depending on the molar absorbance coefficient of the dye, but is normally $1 \times 10^{-2}$ g/m$^2$ to 1 g/m$^2$ and preferably 50 to 500 mg/m$^2$.

Specific examples of dyes are described in detail in JP-A-63-64039.

The photosensitive material of the present invention may include therein a variety of compounds for preventing fogging or stabilizing photographic properties during manufacture, storage or photographic processing of the material. That is, one may add many compounds that are known as antifoggants or stabilizers, examples including azoles, e.g., benzothiazolium salts, nitroindazoles, chlorobenzimidazoles, bromobenzimidazoles, mercaptothiazoles, mercaptobenzothiazoles, mercaptothiadiazoles, aminotriazoles, benzothiazoles and nitrobenzotriazoles; mercaptopyrimidines; mercaptotriazines; thioketo compounds such as oxazolinethione; azaindenes, e.g., triazaindenes, tetraazaindenes (especially 4-hydroxy-substituted (1,3,3a,7)tetraazaindenes) and pentaazaindenes; benzenethiosulfonic acid, benzenesulfinic acid and benzenesulfonic acid amides.

In order to improve sensitivity, improve contrast or accelerate development, one may include in the photographic emulsion layer of the photographic material of the present invention developing agents such as polyalkylene oxides or derivatives such as ethers, esters or amines thereof, thioether compounds, thiomorpholines, quaternary ammonium salt compounds, urethane derivatives, urea derivatives, imidazole derivatives, dihydroxybenzenes and 3-pyrazolidones. Among these, dihydroxybenzenes (hydroquinone, 2-methylhydroquinone, catechol) and 3-pyrazolidones (1 phenyl-3-pyrazolidone, 1-phenyl 4-methyl-4-hydroxymethyl-3-pyrazolidone) are preferred and normally not more than 5 g/m$^2$ thereof is used. 0.01 to 1 g/m$^2$ is more preferred in the case of dihydroxybenzenes and 0.01 to 0.2 g/m$^2$ is preferred in the case of 3-pyrazolidones.

Inorganic or organic hardeners may be included in the photographic emulsion or insensitive hydrophilic colloid of the present invention. For example, active vinyl compounds (e.g., 1,3,5-triacryloyl-hexahydro-s-triazine, bis(vinylsulfonyl)methyl ether, N,N'-methylenebis-[β-(vinylsulfonyl)propionamide]), active halogen compounds (e.g., 2,4-dichloro-6-hydroxy-s-triazine), mucohalogenic acids (e.g., mucochloric acid), N-carbamoylpyridinium salts (e.g., (1-morpholinocarbonyl-3-pyridinio)methanesulfonate), haloamidinium salts (e.g., 1-(1-chloro-1-pyridinomethylene)pyrrolidinium, and 2-naphthalenesulfonate) may be used alone or in combination. Among such substances, the active vinyl compounds disclosed in JP-A-53-41220, JP-A-53-57257, JP-A-59-162546 and JP-A-60-80846 and the active halogen compounds disclosed in U.S. Pat. No. 3,325,287 are preferred.

The photographic emulsion layers or other hydrophilic colloid layers of photosensitive material produced by means of the present invention may contain a variety of surfactants to serve as coating aids or for the purpose of, e.g., prevention of static, improvement of sliding characteristics, improvement of emulsification dispersion, prevention of adhesion or improvement of photographic characteristics (e.g., developing acceleration, increase in contrast, increase in sensitivity). Examples of useful surfactants include nonionic surfactants such as saponins (steroid type); alkylene oxide derivatives (e.g., polyethylene glycol, polyethylene glycol/polypropylene glycol condensates, polyethylene glycol alkyl ethers or alkylaryl ethers, polyethylene glycol esters, polyethylene glycol sorbitan esters, polyalkylene glycol alkylamines or amides, silicone-polyethylene oxide adducts), glycidol derivatives (e.g., alkenylsuccinic acid polyglyceride, alkylphenol polyglyceride), polyhydric alcohol fatty acid esters and alkyl esters of sugars; anionic surfactants containing carboxyl, sulfo, phospho, sulfate, or phosphate groups, e.g., alkylcarboxylates, alkylsulfonates, alkylbenzenesulfonates, alkylnaphthalenesulfonates, alkylsulfates, alkylphosphates, N-acyl-N-alkyltaurines, sulfosuccinates, sulfoalkylpolyoxyethylene alkylphenyl ethers and polyoxyethylenealkyl phosphates; amphoteric surfactants such as amino acids, aminoalkylsulfonic acids, aminoalkyl sulfates or phosphates, alkylbetaines and amine oxides; and cationic surfactants such as alkylamine salts, aliphatic or aromatic quaternary ammonium salts, heterocyclic quaternary ammonium salts such as pyridinium, imidazolium and phosphonium or sulfonium salts containing aliphatic or hetero-rings.

It is preferred to use a fluorine-containing surfactant such as disclosed in, e.g., JP-A-60-80849 in order to prevent static.

Matting agents such as silica, magnesium oxide, barium strontium sulfate, polymethyl methacrylate may be included in photographic emulsion layers or other hydrophilic colloid layers of the photographic photo-sensitive material of the present invention in order to prevent adhesion.

A dispersion of a water-insoluble or sparingly-soluble synthetic polymer may be included in the photosensitive material that is used in the invention in order to improve physical film properties. For example, a polymer whose monomer components are alkyl(meth)acrylate, alkoxyalkyl(meth)acrylate or glycidyl (meth)acrylate alone or in combination, or combinations of these substances with acrylic acid or methacrylic acid can be used.

Use of gelatin as a binder or protective colloid for the photographic emulsion is advantageous, but other hydrophilic colloids may also be used. For example, gelatin derivatives, graft polymers of gelatin with other macromolecular substances, proteins such as albumin or casein, cellulose derivatives such as hydroxyethylcellulose, carboxymethylcellulose, cellulose sulfate, sodium alginate, sugar derivatives such as starch derivatives, polyvinyl alcohol, polyvinyl alcohol partial acetate, poly-N-vinylpyrrolidone, polyacrylic acid, polymethacrylic acid, polyacrylamide, polyvinylimidazole, polyvinylpyrazole and a large number of other hydrophilic synthetic polymers may be employed alone or in the form of copolymers.

The gelatin employed may be lime-treated gelatin or acid-treated gelatin and one can also use the decomposition products of gelatin hydrolysis or enzymolysis.

A polymer latex such as alkylacrylate may be included in silver halide emulsion layers used in the present invention.

Materials such as cellulose triacetate, cellulose diacetate, nitrocellulose, polystyrene or polyethylene terephthalate may be used as a support for the photosensitive material of the present invention. For COM film in particular, use of a support with good electrical conductivity is preferred since it is important that the film have outstanding antistatic properties.

A variety of known developing agents may be used to develop the photosensitive material of the present invention. In more detail, substances such as polyhydroxybenzenes, e.g., hydroquinone, 2-chlorohydroquinone, 2-methylhydroquinone, catechol or pyrogallol; aminophenols, e.g., p-aminophenol, N-methyl-p-aminophenol or 2,4-diaminophenol; 3-pyrazolidones, e.g., 1-phenyl-3-pyrazolidones, 1-phenyl-4,4-dimethyl-3-pyrazolidone, 1-phenyl-4-methyl-4-hydroxymethyl-3-pyrazolidone or 5,5-dimethyl-1-phenyl-3-pyrazolidone; and ascorbic acids can be used alone or in combination. Specifically, use can be made of developing solutions such as described in U.S. Pat. No. 4,540,655.

Primary aromatic amine developing agents, preferably p-phenylenediamine developing agents can be used to obtain dye images in the presence of dye-forming couplers. Specific examples include 4-amino-3-methyl-N,N-dimethylanilinehydrochloride, N,N-diethyl-pphenylenediamine, 3-methyl-4-amino-N-ethyl-N-β-(methanesulfoamido)ethylaniline, 3-methyl-4-amino-N-ethyl-N-(β-sulfoethyl)aniline, 3-ethoxy-4-amino-N-ethyl-N-(β-sulfoethyl)aniline and 4-amino-N-ethyl-N-(β-hydroxyethyl)aniline. Developing agents such as these may be included in alkaline processing compositions (processing elements) or be included in suitable layers of photosensitive elements.

If DRR compounds are used in the present invention, these may be any compounds as long as they can be cross-oxidized and they can be used with any type of silver halide developing agent.

Substances such as sodium sulfite, potassium sulfite, ascorbic acid or reductones (e.g., piperidinohexose reductone) may be included in the developing solution as preservatives.

The photosensitive material of the present invention permits production of direct positive images by development using a surface developing solution. A surface developing solution is one with which developing processes are essentially brought about by fogging nuclei and latent image on the surfaces of silver halide grains. Although it is preferable that no silver halide dissolving agent be included in the developing solution, such a dissolving agent (e.g., a sulfite) may be included as long as it makes essentially no contribution to internal latent images prior to completion of silver halide grain surface development.

The developing solution may contain as alkali agents or buffer agents in the form of sodium hydroxide, potassium hydroxide, sodium carbonate, potassium carbonate, trisodium phosphate or sodium metaborate. The amounts included of such agents are so selected that the developing solution pH is 10 to 12, preferably 10 to 11.5, and more preferably 10.0 to 11.0.

A color developing accelerator such as benzyl alcohol may be included in the developing solution. For the purpose of lowering the minimum density of direct positive images, it is advantageous to further include in the developing solution a compound normally employed as an antifoggant, e.g., a benzimidazole such as 5-nitrobenzimidazole or a benzotriazole such as benzotriazole or 5-methylbenzotriazole.

The present invention is now described in greater detail with reference to specific examples thereof, but the present invention is not to be construed as being limited thereto. Unless otherwise indicated, all parts, percents and ratios are by weight.

EXAMPLE 1

An emulsion A was prepared by the following manner.

Emulsion A

An emulsion of octahedral silver bromide with an average grain diameter of 0.15 μm was produced by simultaneous addition, accompanied by vigorous stirring for 5 minutes at 75° C., of a potassium bromide aqueous solution and a silver nitrate aqueous solution to a gelatin aqueous solution in the presence of a 1,8-dihydroxy-3,6-dithiaoctane solvent. After adjustment of the solution's pAg to 8.20, to the emulsion produced was added 11.5 mg each of sodium thiosulfate and chloroauric acid (tetrahydrate) per 1 mole of silver and the emulsion was chemically sensitized with heating for 50 minutes at 75° C. The silver bromide grains thus produced were used as cores and were grown further by being treated for 40 minutes in the same precipitation environment as above but with control of the solution's pAg to 7.50, ultimately producing a monodisperse core/shell emulsion of cubic silver bromide grains with an average grain diameter of 0.25 μm. After water washing and desalting, to this emulsion was added 3.4 mg each of sodium thiosulfate and chloroauric acid (tetrahydrate) per 1 mole of silver and chemically sensitized with heating for 60 minutes at 75° C., so giving an internal latent image type silver halide emulsion A. Emulsion A was divided into separate lots to which the amounts as indicated in Table 1 of compound (a) of the present invention and comparative compounds were added. Additions were also made of $2.5 \times 10^{-6}$ moles/1 mole Ag of the illustrated compound (N-I-15) as a nucleating agent, of $1.2 \times 10^{-3}$ moles/1 mole Ag of the illustrated compound (III-12) as a sensitization dye and of 4- hydroxy-6-methyl-1,3,3,3a-tetraazaindene and 5-methylbenzotriazole as stabilizers and 1,3-divinylsulfonyl-2-propanol as a hardening agent. Further, to a gelatin solution for use as a surface protection layer was added barium strontium sulfate with an average grain diameter of 1.0 μm as a matting agent, 50 mg/m² of hydroquinone, 20 mg/m² of a compound of the structural formula (1) given below and as coating aids of sodium p-dodecylbenzenesulfonate and a surfactant with the structural formula (2) given below. Samples 1 to 6 were prepared by coating this solution together with an emulsion by a simultaneous coating process to give an Ag quantity of 1.6 g/m² on a polyethylene terephthalate film.

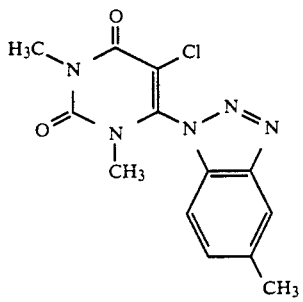
(1)

$\Delta$log E 0.2 is defined as the speed amplitude since it defines the difference between the reversal speed that gives a density of Dmin+0.2 and the rereversal negative speed that gives a density of Dmin+0.2, as the difference of log E values. As is clear from the definition, a large speed amplitude signifies that re-reversal negatives are suppressed.

It is seen that in contrast to the Comparative Samples No. 2 to No. 5, with Sample 6 containing compound (a) according to the present invention there was hardly any change in Dmax, Dmin or Sp-df, and this sample provided good photographic performance and a marked reduction of re-reversal negative image formation.

TABLE 1

| Example No. | Compound (a) or similar compound Type | Amount Added* | Dmin | Dmax | Sp-df | $\Delta$logE$_{0.2}$ |
|---|---|---|---|---|---|---|
| 1 | — | — | 1.00 | 0.05 | 1.84 | 1.18 |
| 2 | Comparison II-1 | 7.8 × 10$^{-4}$ | 2.00 | 0.06 | 1.52 | 1.20 |
| 3 | " II-8 | " | 1.50 | 0.06 | 1.65 | 1.23 |
| 4 | " II-2 | " | 1.60 | 0.06 | 1.67 | 1.31 |
| 5 | " II-3 | " | 1.82 | 0.06 | 1.48 | 1.19 |
| 6 | Invention Compound (a) | " | 1.02 | 0.05 | 1.86 | 1.82 |

EXAMPLE 2

Coating and testing were conducted in the same manner as in Example 1 except that compound (a) was combined with the accelerators shown in Table 2. The results are shown in Table 3. The symbols and abbreviations in the table have the same definitions as in Example 1.

As is apparent from the results, joint use of compound (a) together with an accelerator provided good performance in that there is a marked reduction of rereversal negative formation without any loss of Dmax increase effects being caused by the accelerator, i.e., with hardly any change in Dmax or Sp-df.

TABLE 2

| Sample No. | Compound (a) Amount added* | Nucleating Agent Type | Amount added* | Accelerator Type | Amount added* | Sensitization Dye Type | Amount added* |
|---|---|---|---|---|---|---|---|
| 1 | Comparison — | N-I-15 | 2.5 × 10$^{-6}$ | — | — | — | — |
| 2 | " — | " | " | II-1 | 8.8 × 10$^{-4}$ | — | — |
| 3 | " — | " | " | " | " | III-12 | 1.2 × 10$^{-3}$ |
| 4 | Invention 7.8 × 10$^{-4}$ | " | " | — | — | — | — |
| 5 | " " | " | " | II-1 | 8.8 × 10$^{-4}$ | — | — |
| 6 | " " | " | " | " | " | III-12 | 1.2 × 10$^{-3}$ |
| 7 | " 5.2 × 10$^{-3}$ | " | " | — | — | — | — |
| 8 | " " | " | " | II-1 | 8.8 × 10$^{-4}$ | — | — |
| 9 | " " | " | " | " | " | III-12 | 1.2 × 10$^{-3}$ |

*moles/1 mole Ag

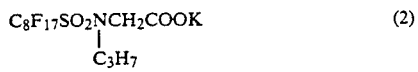
(2)

These samples were exposed for 1×10$^{-4}$ seconds with a 3.75×10$^5$ lux xenon flash light via a continuous wedge.

Positive images were produced by development of the various samples for 30 seconds at 35° C. using Blowstar Plus developing solution (produced by Kodak) and stopping, fixing and washing by normal procedure. The results are indicated in Table 1. In the table, Dmax indicates the maximum density of reversal image, Dmin the minimum density and Sp-df the mid point speed, which is defined as the log E value giving the density (Dmax+Dmin)/2. The reference value is so selected that the speed is higher as the value of log E is greater.

TABLE 3

| Sample No. | | Dmin | Dmax | Sp-df | $\Delta$logE$_{0.2}$ |
|---|---|---|---|---|---|
| 1 | Comparison | 0.15 | 0.92 | 1.84 | 1.18 |
| 2 | " | 0.17 | 2.47 | 1.00 | 0.79 |
| 3 | " | 0.05 | 2.41 | 1.87 | 1.62 |
| 4 | Invention | 0.10 | 0.91 | 1.83 | 1.50 |
| 5 | " | 0.13 | 2.49 | 1.01 | 1.10 |
| 6 | " | 0.05 | 2.43 | 1.89 | 2.01 |
| 7 | " | 0.07 | 0.90 | 1.83 | 1.70 |
| 8 | " | 0.09 | 2.45 | 1.00 | 1.30 |
| 9 | " | 0.05 | 2.40 | 1.89 | 2.30 |

EXAMPLE 3

An emulsion B was prepared by the following manner.

Emulsion B

An emulsion of octahedral silver bromide with an average grain diameter of 0.15 μm was produced by simultaneous addition, accompanied by vigorous stirring for 5 minutes at 75° C., of a potassium bromide aqueous solution and a silver nitrate aqueous solution to a gelatin aqueous solution in the presence of a thioether. After adjustment of the solution's pAg to 8.20, to the emulsion produced was added 38 mg each of sodium thiosulfate and chloroauric acid (tetrahydrate) per 1 mole of silver and the emulsion was chemically sensitized with heating for 50 minutes at 75° C. The silver bromide grains thus produced were used as cores and were grown further by being treated for 40 minutes in the same precipitation environment as above but with control of the solution pAg values to 8.20 and 7.70 in different batches, ultimately producing monodisperse emulsions of octahedral and tetradecahedral core/shell silver bromide grains with an average grain diameter of 0.25 μm. After water washing and desalting, to the emulsions were added 6.0 mg each of sodium thiosulfate and chloroauric acid (tetrahydrate) per 1 mole of silver, and the emulsion was chemically sensitized by heating for 60 minutes at 75° C., giving internal latent image type silver halide emulsions B-1 and B-2.

The proportion of the total grain planes that were 100 planes in the grains in each emulsion was determined by the method described in the *Journal of Imaging Science*, 29:165 (1985). The other planes were (111) planes.

| Emulsion | Proportion occupied by 100 planes (%) |
| --- | --- |
| B-1 | 85 |
| B-2 | 15 |

On testing in the same manner in Examples 1 to 2 but using the above noted Emulsions B-1 and B-2 instead of Emulsion A, results like those in Examples 1 to 2 were obtained. It was thus found that in the case of octahedral and tetradecahedral grains too, samples containing compound (a) of the present invention provided excellent direct positive characteristics with much greater reduction of re-reversal negative formation than comparison samples.

EXAMPLE 4

The samples used in Examples 1 to 3 were exposed in the same manner as in Example 1. Following this they were subjected to development for 30 seconds at 35° C. using the development solutions noted below, and stopping, fixing and washing by normal procedure resulted in excellent positive characteristics like those achieved in Examples 1 to 3.

| Developing Solution | |
| --- | --- |
| FR Company | FR Data Com-Pak Negative |
| ALTA Company | Datagraphix Auto Pos Chem Kit |

It will be appreciated from this that the method for processing silver halide photographic materials of the present invention to produce direct positives provides superior results by use of the present invention processing solutions.

While the invention has been described in detail and with reference to specific embodiments thereof, it will be apparent to one skilled in the art that various changes and modifications can be made therein without departing from the spirit and scope thereof.

What is claimed is:

1. A method for forming a direct positive image comprising the steps of:
    (a) imagewise exposing a photosensitive material comprising a support having thereon at least one light-sensitive silver halide emulsion layer containing non-prefogged silver halide grains capable of forming an internal latent image; at least one of the light-sensitive emulsion layer or the other hydrophilic colloidal layer in the photosensitive material containing the following compound (a):

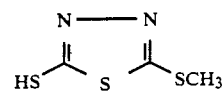

(b) developing said exposed material in the presence of a developing agent and at least one nucleating agent represented by formula (N-I):

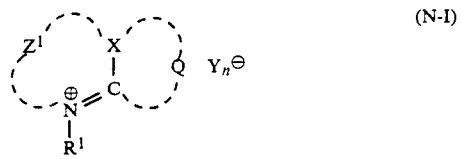

wherein $Z^1$ represents a nonmetallic atomic group necessary for forming a 5-membered or 6-membered hetero ring, a 5-membered or 6-membered heterocyclic ring fused with an aromatic ring, or a 5-membered or 6-membered heterocyclic ring fused with a heterocyclic ring; $R^1$ represents an aliphatic group; X represents

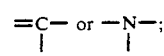

Q represents a nonmetallic atomic group necessary for forming a 4-membered to 12-membered non-aromatic hydrocarbon ring or a 4-membered to 12-membered non-aromatic heterocyclic ring; Y represents a counter ion necessary for charge balance; and n is the number of counter ions necessary for charge balance; provided that at least one of $R^1$, $Z^1$ or Q comprises at least one alkynyl group; and
    (c) at least one of fixing and bleaching said developed photosensitive material to form a positive image.

2. The method for forming a direct positive image as claimed in claim 1, wherein said compound (a) is present in an amount of from $1 \times 10^{-6}$ to $1 \times 10^{-2}$ mol per mol of said silver halide.

3. The method for forming a direct positive image as claimed in claim 1, wherein said compound (a) is present in an amount of from $1 \times 10^{-5}$ to $1 \times 10^{-2}$ mol per mol of said silver halide.

4. The method for forming a direct positive image as claimed in claim 1, wherein said nucleating agent is present in an amount of from $1 \times 10^{-8}$ to $1 \times 10^{-2}$ moles per mol of silver in the silver halide emulsion layer.

* * * * *